United States Patent [19]
Milton et al.

[11] Patent Number: 6,166,803
[45] Date of Patent: Dec. 26, 2000

[54] IMAGING SIMPLIFIED LASER POINTING (ISLAPS)—A SYSTEM MODIFICATION/IMPROVEMENT

[75] Inventors: Richard D. Milton, Laceys Spring; Vernon H. Ayre, Falkville; William F. Otto, Huntsville; John K. Dempsey, Union Grove, all of Ala.

[73] Assignee: The United States of America as represented by the Secretary of the Army, Washington, D.C.

[21] Appl. No.: 07/041,257

[22] Filed: Mar. 20, 1987

[51] Int. Cl.$^7$ .................................................... G01B 11/26
[52] U.S. Cl. ........................................................... 356/152.2
[58] Field of Search ........................................ 356/152, 153, 356/138; 89/1.11

[56] References Cited

U.S. PATENT DOCUMENTS

| | | | |
|---|---|---|---|
| 3,902,036 | 8/1975 | Zaleckas | 356/152 |
| 4,614,913 | 9/1986 | Honeycutt et al. | 356/152 X |

*Primary Examiner*—Mark Hellner
*Attorney, Agent, or Firm*—Arthur H. Tischer; Freddie M. Bush

[57] ABSTRACT

A subsystem addition to the Imaging Simplified Laser Pointing System (ISLAPS). The subsystem in itself is a laser system to be operated off-axis within the field of view of the ISLAPS. This subsystem laser is to be used to interrogate the target. Operation of the ISLAPS at night or with low light conditions is made possible by this addition. The interrogator beam is bounced off the target. In the OA mode the receiver is looking for a retro-reflection or optical augmentation to signal the firing of the negation laser. This mode can be used at any light level. In the illuminator mode the interrogator is "opened up" to effectively spotlight the target during low light conditions. This allows for imaging, aimpoint selection and video correlation in the same manner as was done with ambient light in the original system. The use of the interrogator also makes it possible to range gate. This reduces background creating clearer images and increases sensitivity because it allows for a reduction in threshold levels.

1 Claim, 1 Drawing Sheet

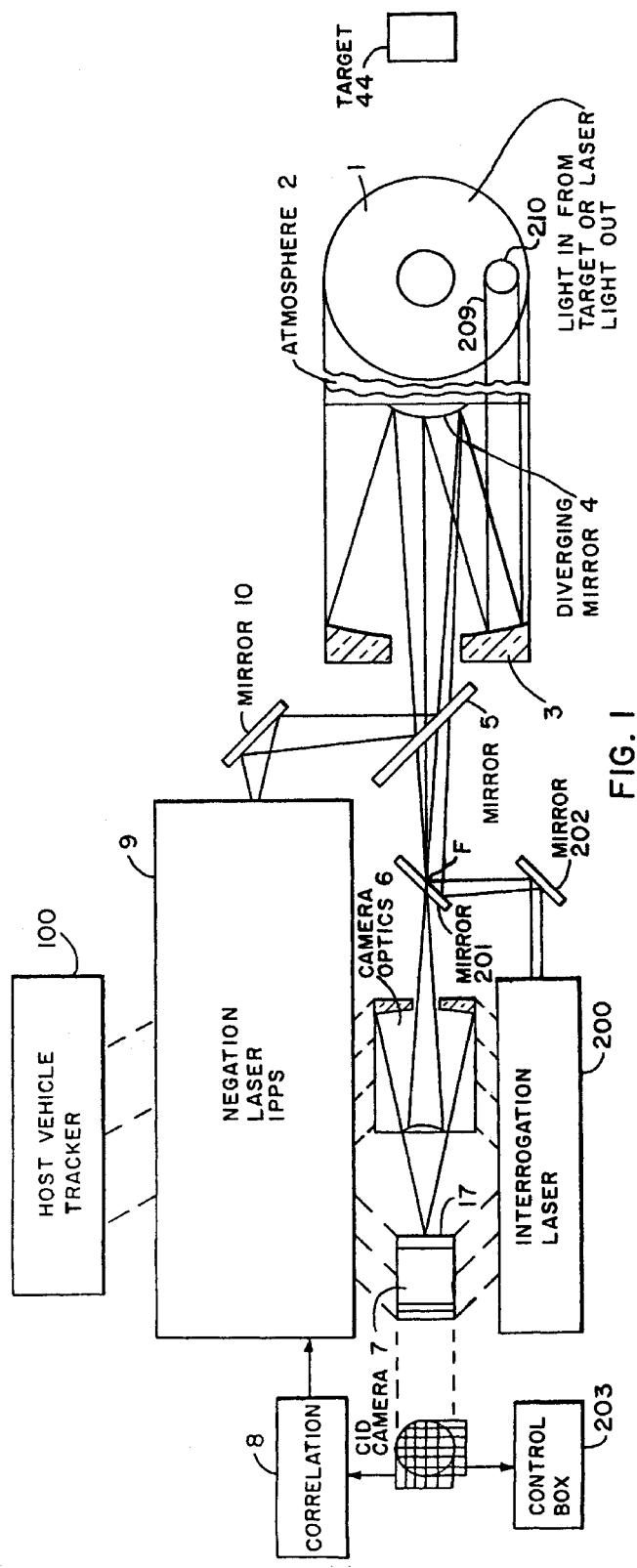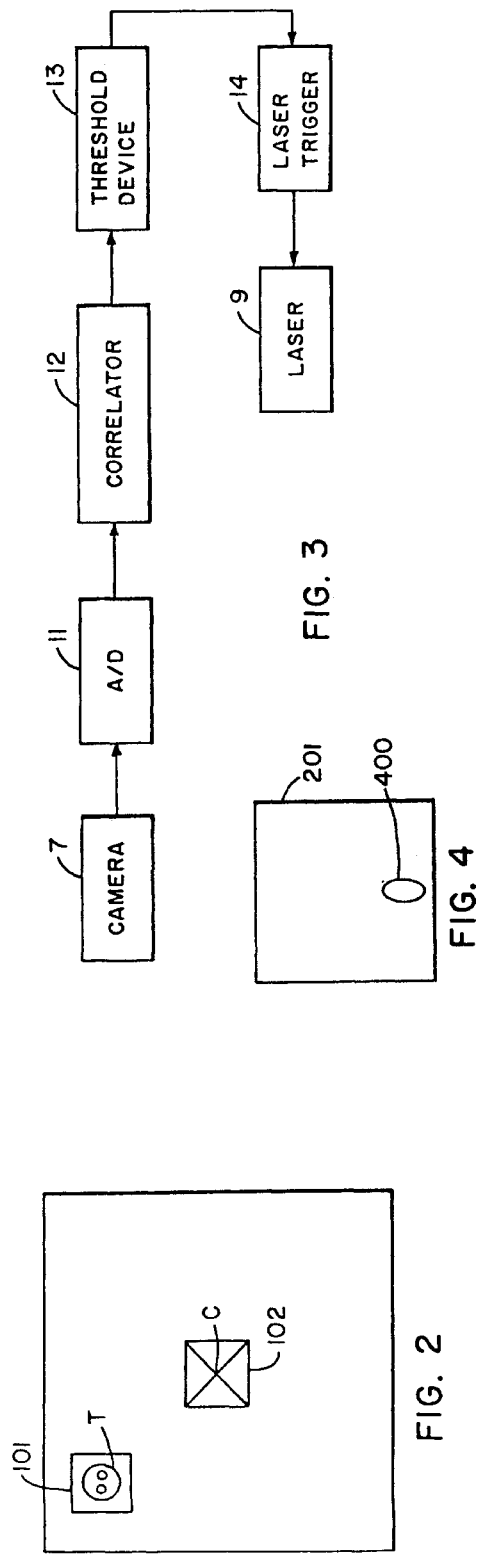

IMAGING SIMPLIFIED LASER POINTING (ISLAPS)— A SYSTEM MODIFICATION/IMPROVEMENT

DEDICATORY CLAUSE

The invention described herein may be manufactured, used, and licensed by or for the Government for governmental purposes without the payment of us of any royalties thereon.

BACKGROUND OF THE INVENTION

Typically laser weapons mounted on host vehicles have rather complex pointing systems which are required to achieve the desired accuracy. An inner gimble set with high bandwidth and small angular motion, is usually used in conjunction with a coarse gimble set having low bandwidth and large angular motion. Weight, size, and cost problems are usually associated with this type system.

A simplified system (SLAPS) was devised which utilized the natural jitter of a human, pointing a hand held weapon, to produce random boresight to target error angles near zero (patent application Ser. No. 835,815, filed Feb. 3, 1986). When this near zero error angle was detected the laser was fired.

Another system described in a patent application entitled ISLAPS AMPC 4390 (under the same inventors of this disclosure) used this same random occurence of near zero error angles, produced by natural jitter, to point a laser mounted on a vehicle. This system used image correlation to detect the near zero error angles. The correlator would automatically fire the weapon. The ISLAPS could replace the fine gimble on conventional systems reducing size, cost, and weight problems. The system uses tracking mount jitter, atmospheric disturbance, and other factors that normally reduce pointing accuracy to advantage rather than fighting them as a disadvantage.

The ISLAPS system as described in the disclosure mentioned above had a major disadvantage which has been addressed in the subsystem add-on described in this disclosure. The original system could not operate in low light or nightime scenarios. The camera could not produce an image. The subsystem described herein will solve this problem by bouncing an interrogator laser beam off the target to provide the required light.

Addition of this subsystem provides some other distinct advantages/improvements over the original system. Normal day time imaging particularly at longer ranges is greatly improved by the addition of this subsystem because of the potential for range gating. Addition of the interrogator laser also permits operation on the mode described in patent application Ser. No. 835,815. Retro-reflections from optics having a focal plane return the interrogator beam. When these returns exceed threshold levels the negation laser (which is aligned to the interrogator) is fired. This mode has potential for both day and night use.

SUMMARY OF THE INVENTION

This disclosure describes a subsystem addition to the Imaging Simplified Laser Pointing System (ISLAPS). The subsystem in itself is a laser system to be operated off-axis within the field of view of the ISLAPS. This subsystem laser is to be used to interrogate the target. Operation of the ISLAPS at night or with low light conditions is made possible by this addition. The interrogator beam is bounced off the target. In the OA mode the receiver is looking for a retro-reflection or optical augmentation to signal the firing of the negation laser. This mode can be used at any light level. In the illuminator mode the interrogator is "opened up" to effectively spotlight the target during low light conditions. This allows for imaging, aimpoint selection and video correlation in the same manner as was done with ambient light in the original system. The use of the interrogator also makes it possible to range gate. This reduces background creating clearer images and increases sensitivity because it allows for a reduction in threshold levels.

BRIEF DESCRIPTION OF DRAWINGS

FIG. 1 is an illustration of an overall concept of the present invention.

FIG. 2 illustrates the view seen on the monitor screen prior to aimpoint selection.

FIG. 3 is a block diagram showing the control system in greater detail.

FIG. 4 illustrates mirror 201.

DETAILED DESCRIPTION OF THE BEST MODE AND PREFERRED EMBODIMENT

The addition to the ISLAPS described in this disclosure adds two modes of operation to the system for a total of three. These modes are normal mode, OA mode (optical augmentation or retro-reflection), and illumination mode. A step-by-step description of how the system works in each mode is given below.

Normal Mode: Light from the target 1 (FIG. 1) is transmitted through the atmosphere 2 and gathered by the 14 inch converging mirror 3 (open center) which reflects into a diverging mirror 4. The light is then reflected through the open center of the 14 inch mirror 3, passes through laser turn mirror 5, (which is designed to pass this frequency of light and reflect that from the laser) goes through focus F (to protect camera optics) and is refocused with camera optics 6 onto a phosphor plate 17 in the CID camera 7. The image intensifier built into the camera gates intensifies the signal and passes it on through an analog-to-digital converter 11 (FIG. 3) to the correlator package 8. The correlator package digitizes the signal and performs correlation functions. If and when a set correlation threshold is exceeded a trigger signal is sent to fire the laser 9. The output path of the laser strikes a turn mirror 10, then strikes turn mirror 5 and is transmitted through the 14 inch telescope 3 and 4, and the atmosphere 2 to the selected aimpoint on the target.

The target would initially be acquired and tracked by another system on the host vehicle tracker 100, perhaps an edge tracker or contrast TV tracker. This system would point the ISLAPS so that the target being tracked would appear in the one milli-radian field of view (FOV) of the ISLAPS system. The image would thus be displayed via the CID camera 7 onto a video monitor (FIG. 2) located at the operator. A camera such as the General Electrics TN2250 $512^2$ CID Television Camera or a Random Access Charge Injection Device (RACID) can be used. The operator would cue the electronics to gate the image intensifier on for approximately one millisecond and hold this picture on the screen. The atmosphere essentially will be "frozen" and the image should be relatively free of atomspheric distortion and smearing. The operator would then select a target T by running the projected set of crosshairs from the center C over to the aimpoint of the target (see FIG. 2). The operator then cues the tracking device 100 to offset the ISLAPS to the aimpoint determined by the crosshairs. A 10×10 element subarray 101 (FIG. 2) centered about the selected target aimpoint is digitized by analog-to-digital converter A/D 11 (FIG. 3) and stored automatically in the correlator 12 memory as the reference. As soon as these steps are accomplished, live video data acquisition from camera 7 is resumed at the rate of 1000 Hz. The A/D 11 (FIG. 3) digitizes each signal and the correlator correlates the information in each element of the central 10×10 subarray to each corresponding element in the reference 10×10 subarray 102 (FIG. 2). The greater the fit the greater the output of the correlator and the more likely mirror 3 is boresighted on the target. The correlator is looking for a near zero error angle between a live signal 102 and the reference 101 (see FIG. 2). A correlator such as TMC2220 shown in Electronic "Design Entry" May 17, 1984 could be used.

The ISLAPS is being pointed by the host tracking system 100 with aimpoint offset. This aimpoint and target are continually moving around in the FOV due to atmospheric distortion and natural jitter of the host tracking system. The correlator is in effect waiting for the aimpoint to nearly cross the center C (FIG. 2) of the system FOV which is by design the laser axis. When correlation exceeds a set threshold level in device 13 the laser Trigger 14 is activated and the laser 9 (with a 100 rad beam and jitter less than 30 rad) is automatically fired (see FIG. 3). The operator makes adjustments as often as possible by repeating the above procedure thereby giving the ISLAPS a new reference and aimpoint. This is particularly important for targets that are changing aspect angles. While the operator obtains a new picture and updates the aimpoint, correlation continues on the most recently acquired reference. The ISLAPS is uncoupled from the crosshairs during this effort and recoupled upon completion. This process of correlation and operator update continues until correlation threshold is exceeded or another target is selected.

OA Mode: This mode of operation is useful under any lighting conditions. Optical augmentations (OA) or retroreflections from the interrogator are returned from optics possessing a focal plane. These signals indirectly trigger the negation laser provided they exceed certain threshold levels. The following is a step by step description of the device operation in this mode. (Refer to FIG. 1). The interrogator pulse laser 200 running at the rate of 1000 Hz directs each pulse onto a turn mirror 202 and onto a second turn mirror 201, passes off the system axis through mirror 5, strikes a portion of the diverging reflector 4, a portion of the 14" converging mirror 3 and is propagated through the atmosphere 2 to the target 44. Any OA return 209 (retro reflection) from the target 1 passes back through the atmosphere 2 is gathered by the converging mirror 3, strikes the diverging reflector 4, passes through turn mirror 5 (which is reflective only at negation laser wavelength), passes through turn mirror 201 (reflective to interrogator laser only in small off-axis area due to the fact that only area 400 is silvered— See FIG. 4), through focus F (for optics protection) and is refocused by the camera optics 6 into the camera and image intensifier 7. Each signal is then passed on from the CID in the back of the camera to a control box 203. The box contains amplifier, signal processor, and logic circuits. The control box decides whether or not the signals reaching it were OA. If the decision is yes, another signal is sent to fire the negation laser 9 which is aligned with the interrogation laser 200 and the optical axis of the system. The laser pulse from 9 strikes mirror 10, mirror 5, diverging reflector 4, the 14" converging mirror 3, and is transmitted through the atmosphere 2 to the target 44. The mirror 201 (FIG. 4) will reflect less than 10% and return from the target towards laser 200; however it will reflect all of the output beam from laser 200.

Illumination Mode: This mode of operation is primarily for nightime operation but can complement daytime operation as well. The interrogation laser could be "opened up" to produce a larger beam; one that would in effect illuminate the target at night for video imaging and operator aimpoint selection. The correlator would store a reference and compare live images against it in the same way as described for daytime use in the ISLAPS disclosure. The following is a step by step description of the total system operation in this mode. (Refer to FIG. 1). The interrogator laser 200 operating at the rate of 1000 Hz in the illumination mode directs each pulse onto a turn mirror 202, then onto a second turn mirror 201, passes off-axis (around mirror 5), strikes the diverging reflector 4, the 14" converging mirror 3 and is propagated through the atmosphere 2 to the target 44. The light 1 is reflected from the target (source) passes back through the atmosphere 2 is gathered by the 14" converging mirror 3, strikes the diverging reflector 4, passes through turn mirror 5 (reflective only at negation laser wavelength), passes through turn mirror 201 (reflective to interrogator laser only in small off-axis area), through focus F (for optics protection) and is refocused by the camer optics 6 into the camera and image intensifier 7. The image intensifier gates and intesifies the signal and passes it on to the correlation package 8. The correlator digitizes the signal and performs correlator functions. If and when a set correlation threshold is exceeded, a trigger signal is sent to fire the negation laser 9 which is aligned with the interrogation laser 200 and optical axis of the system. The laser pulse from 9 strikes mirror 101, mirror 9, diverging reflector 4, the 14" coverging mirror 3, and is transmitted through the atmosphere 2 to the target 44.

Changes to the normal operation for the illuminator mode apply only to the method in which imaging is accomplished. Since this mode is primarily for low light or nightime operation, the tracking system has brought the target into the 1 milli-radian FOV of the ISLAPS, the interrogator laser, which has been "opened up", begins illumination of the target. Imaging is now possible and operation continues as if in the normal mode described above.

When the interrogator subsystem is used in the OA mode the imaging and video correlation are not used. Sensors receiving the returns pass signals onto a control box 203 which is like correlation box 8. Signal processing and logic functions take place in box 203. When interrogator laser returns exceed pre-set threshold values the negation laser is fired. The return will be inhanced due to the cats eye effect of any optics about the target.

The interrogator provides the potential for range gating which could be used in both the OA and illumination modes. In the OA mode, logic would require two consecutive return signals from within the range gate to exceed threshold before firing the negation laser. This would reduce the number of "false alarms". In addition, the gating reduces background which permits lower threshold settings and thus greater sensitivity. Background is also reduced in the illumination mode allowing for clearer imaging.

We claim:

1. In a system in which an optical device having a boresight is being caused to track a target, detector means for determining when a boresight of said optical device is centered upon the target and triggering an output signal, and power means for generating a negation laser beam through said optical device to said target when said output signal is triggered, the improvement comprising an interrogation pulse laser having an output beam located spacially from the optical device, a mirror system for reflecting said output beam through the boresight of the optical device so as to allow said output beam to illuminate said target so that the detector means can sense reflection from said target, said mirror system is aligned such that said output beam will be directed off axis at the target, said mirror system has a partial mirror located in the boresight of said optical device, and said mirror is only silvered in a small off-axis area allowing all of the output beam to be reflected at the target but reflecting less than 10% of any return signal from said target.

* * * * *